June 17, 1952  S. C. HETH  2,600,768
ROCKER BEARING FOR RUNNING GEARS
Original Filed Feb. 29, 1944
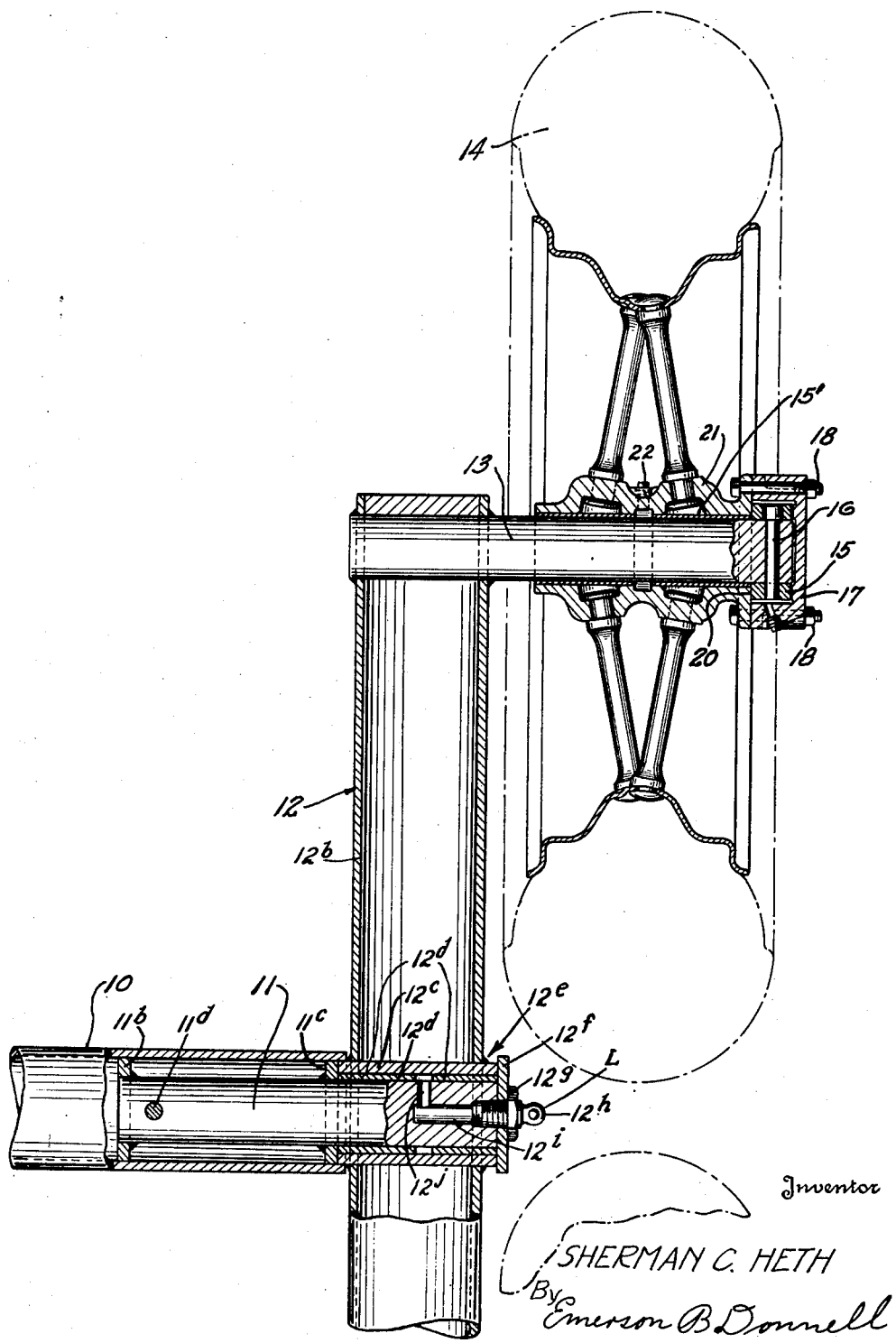
Inventor
SHERMAN C. HETH
By Emerson B Donnell
Attorney Patented June 17, 1952

2,600,768

UNITED STATES PATENT OFFICE 2,600,768

ROCKER BEARING FOR RUNNING GEARS

Sherman C. Heth, Racine, Wis., assignor to J. I. Case Company, Racine, Wis., a corporation of Wisconsin Continuation of application Serial No. 524,468, February 29, 1944. This application December 22, 1947, Serial No. 793,184

2 Claims. (Cl. 280—104.5)

This invention is an improvement in running or ground gear for threshing machines of the mobile type pulled by a tractor and operatively interrelated and co-functioning with a sickle bar and with a means usually provided to transfer the severed grain to the threshing machine.

This application is a continuation of the abandoned application of Sherman C. Heth, Serial No. 524,468, filed February 29, 1944.

In a machine of this type it is important to avoid excessive variation in the height of the sickle above the ground, and also to keep the machine as nearly as practical parallel to the horizontal to assure the efficiency of the cleaning process. The construction proposed by the present invention equips each end of the main supporting axle of the threshing machine with an equalizing lever, the central or hub portion of which is pivotally interconnected with its end of the main axle. Suitable bearings and journals together with adaptation for lubrication are provided for this pivotal interconnection. At the outer ends of each equalizing lever, a stub axle is fixed. The stub axles project outwardly from their respective levers. Ground wheels are rotatably supported on the stub axles by means of suitable anti-friction bearings. Special and advantageous means is provided to maintain the ground wheels in proper axial position on their respective shafts.

With such a construction, two wheels so equalizably supported at each end of the main supporting axle of the threshing machine in rolling over ground of unlevel or irregular contour or ground presenting rocks, clods, or other obstructions will reduce the rise and fall of the threshing machine to one-half of what it would be with the conventional single wheel. In like manner, tilting of the machine due to an obstruction encountered by one side only of the machine is similarly reduced.

These objects of the invention and other ancillary advantages are attained by the mechanism, construction, and arrangement illustrated in the accompanying drawing which shows a fragmentary view in horizontal cross section illustrating the manner in which each ground wheel is mounted on its stub axle, and the manner in which each equalizing lever is rotatably interconnected with the main supporting axle.

The structural members of the threshing machine carry a pipe 10.

One of the main axles of the threshing machine, designated as 11 is supported by the pipe 10 by means of suitable bearing plates or collars 11$^b$ and 11$^c$ apertured to receive axle 11 and fitting within pipe 10. A bolt or the like 11$^d$ extends through axle 11 and pipe 10, transfixing these members so as to maintain the axle in place in the pipe.

An equalizing lever generally designated as 12 is rotatably or pivotally mounted at and on the main axle 11. This lever 12 is of pipelike construction as particularly shown in the drawing.

A stub axle 13, is fixed to the outer end of the lever 12.

A ground wheel 14, is rotatably supported on the stub axle 13, by means of suitable bearings preferably anti-friction bearings 15'.

To maintain each ground wheel in proper axial position on its axle, a collar 15 is pinned thereto by pin 16. A cap 17 is fitted over the collar 15 and is secured by bolts and nuts 18 to a flange 20 of the hub 21 of the adjacent wheel 14. A lubricating fitting 22 communicates with the interior of hub 21 for supplying lubricant to the bearing 15'.

Referring to the drawing which is typical of the four wheels, a tubular element 12$^b$ is placed transversely of axle 11 and pivoted thereon in much the same manner as a wheel would be in a conventional arrangement. For this purpose, tube 12$^b$ is apertured and receives therein a shell 12$^c$ which acts as a journal bearing and carries bushings 12$^d$—12$^d$ which have a press fit in shell 12$^c$ and form the journal bearing for axle 11. Shell 12$^c$ is welded at 12$^e$ or otherwise securely fixed in tube 12$^b$. Shell 12$^c$ projects from tube 12$^b$ a short distance into pipe 10 and abuts against bearing plate 11$^c$ which constitutes a shoulder to prevent excessive end play while the other end of shell 12$^c$ projects into proximity to a plate 12$^f$ held in place on the end of axle 11 by a hollow cap screw 12$^g$. In this manner, shell 12$^c$ is substantially prevented from moving endwise on axle 11 but is free to rock thereon. A lubricating fitting 12$^h$ on cap screw 12$^g$ communicates therethrough with a passageway 12$^i$ within axle 11 and which connects with a port 12$^j$ leading to the space between bushings 12$^d$—12$^d$ so that lubricant may be introduced to facilitate rocking of the lever 12 and prevent entrance of dirt into the bearing.

While I have shown and described one construction in which the invention may be advantageously embodied, it is to be understood that the construction shown has been selected merely for the purpose of illustration or example and that various changes in the size, shape and arrangement of the parts may be made without departing from the spirit of the invention or the scope of the subjoined claims.

The above being a complete description of an illustrative embodiment of the invention, what is claimed as new and desired to be secured by Letters Patent of the United States is:

1. A rocker bearing for a running gear including a transverse tubular member, said bearing comprising a journal member partly within said transverse tubular member and extending outwardly beyond the end thereof, annular collar members on said journal member, one spaced inwardly from the end of said transverse tubular member and another spaced inwardly from the first, a relatively great distance as compared with the spacing of said first annular collar member from the end of said transverse tubular member, means for maintaining said journal member and said annular members in place in said transverse tubular member, a rocker bearing sleeve pivotally supported on said journal member and extending into said transverse tubular member to the extent permitted by said first annular collar member to provide a sand collar for said bearing sleeve, and means for maintaining said bearing sleeve in place on said journal member.

2. A rocker bearing for use with a vehicle running gear comprising a transverse tubular member, a fore and aft rockable tubular member disposed at the end of said transverse tubular member and normal to the axis thereof, laterally extending wheel carrying axles secured to the extremities of said rockable tubular member and transport wheels journaled on said wheel carrying axles; said rocker bearing comprising a journal member partly within said transverse tubular member and extending outwardly beyond the end thereof, annular collar means on said journal member, one spaced inwardly from the end of said transverse tubular member and fitting within said transverse tubular member, means for maintaining said journal member in place in said transverse tubular member, a rocker bearing sleeve pivotally supported on said journal member and extending into said transverse tubular member to the extent permitted by said annular collar member to provide a sand collar for said bearing sleeve, and means for maintaining said bearing sleeve in place on said journal member.

SHERMAN C. HETH.

REFERENCES CITED

The following references are of record in the file of this patent:

UNITED STATES PATENTS

| Number | Name | Date |
|---|---|---|
| 1,925,536 | Judd | Sept. 5, 1933 |
| 2,085,214 | Francis | June 29, 1937 |
| 2,088,442 | Sanchez | July 27, 1937 |
| 2,124,149 | Redhead | July 19, 1938 |
| 2,367,751 | Bombardier | Jan. 23, 1945 |